June 10, 1952  E. E. ST. JOHN  2,600,172
DIRECT CURRENT TO ALTERNATING CURRENT SIGNAL CONVERTER
Filed Jan. 28, 1949  2 SHEETS—SHEET 1
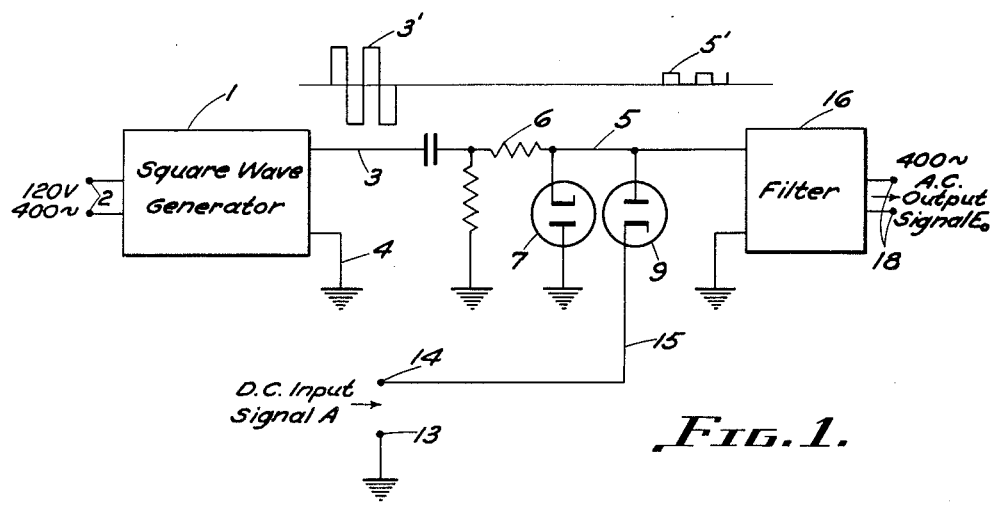
FIG. 1.
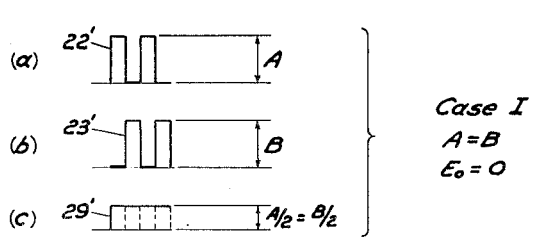
Case I
A = B
$E_o = 0$
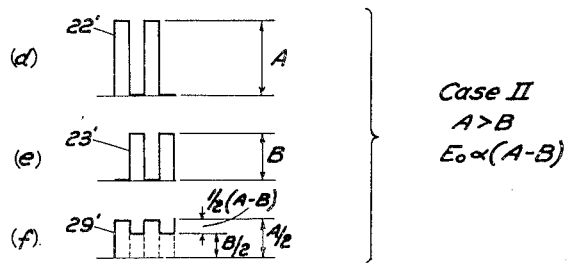
Case II
A > B
$E_o \propto (A-B)$
FIG. 3.
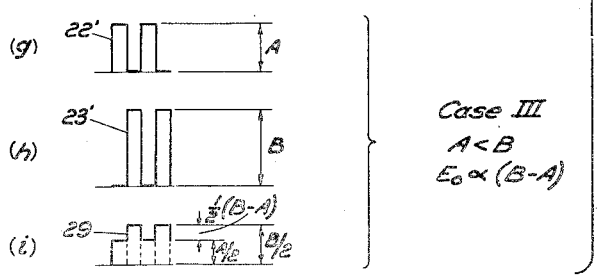
Case III
A < B
$E_o \propto (B-A)$
INVENTOR.
Ercell E. St. John
BY
Roland A. Anderson
ATTORNEY

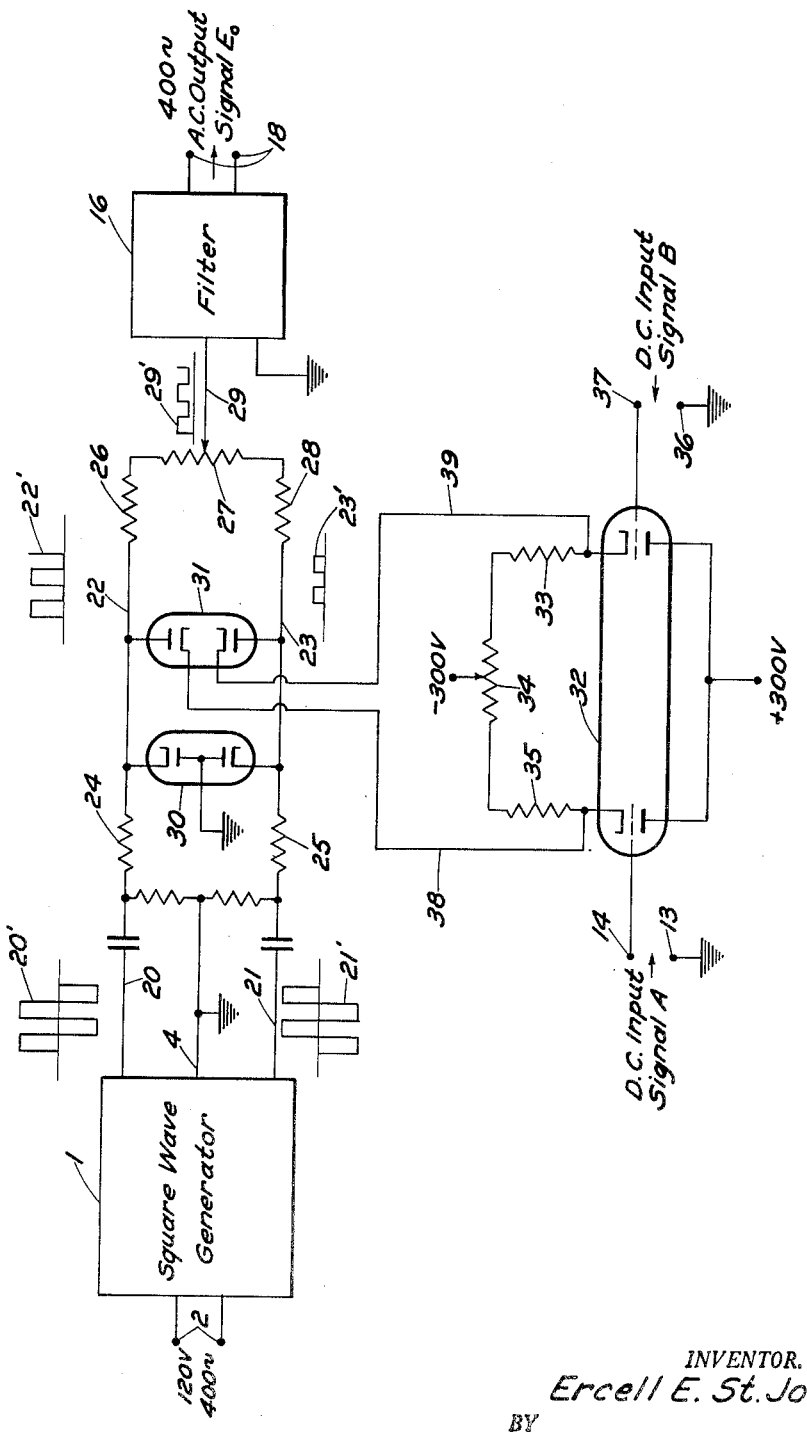

Patented June 10, 1952

2,600,172

UNITED STATES PATENT OFFICE 2,600,172

DIRECT-CURRENT TO ALTERNATING-CURRENT SIGNAL CONVERTER

Ercell E. St. John, Oak Ridge, Tenn., assignor to the United States of America as represented by the United States Atomic Energy Commission Application January 28, 1949, Serial No. 73,394

6 Claims. (Cl. 321—2)

This invention relates to modulators of the type adapted to produce an A. C. output signal proportional to a D. C. input signal, and of the type adapted to produce an A. C. output signal proportional in magnitude, and corresponding in phase, to the magnitude and sign, respectively, of the difference between two D. C. input signals.

Although the present invention may be employed generally wherever D. C. to A. C. conversion is desired, a common application of such converters, or modulators, is found in A. C. servo-mechanisms wherein an A. C. motor is used to drive a controlled member in accordance with the magnitude and phase of an A. C. error signal applied to one of the motor windings. In some A. C. servo systems, it is convenient to initially obtain the error signal as a D. C. signal, and in such cases it is apparent that a converter is required to convert the D. C. signal to a proportional A. C. signal. In other A. C. servo systems, it is desirable to derive the A. C. error signal directly from two D. C. signals which represent the positions of the controlled member and controlling member, respectively. In such systems, it is evident that a differential converter, or modulator, is required which is able to compare the two D. C. signals and produce an A. C. error signal which is proportional in magnitude to the difference between the D. C. signals, and which corresponds in phase to the algebraic sign of that difference.

In certain servo applications, electromechanical modulators, such as "choppers," "vibrators," and so forth, may be satisfactory. However, such automatic mechanical switching arrangements are prone to failure, and for this reason cannot be employed in an application where certainty of operation is at all important. In such applications, non-mechanical modulators (normally electronic) are usually employed, and it is to such non-mechanical modulators that this invention relates.

Non-mechanical modulators heretofore available have never been entirely satisfactory from all points of view, and the choice of any particular one of the types available has represented a compromise as to undesirable characteristics. For example, presently available types of electronic modulators are in general unsatisfactory in one or more of their pertinent operating characteristics, such as linearity, accuracy, amount of drift, signal range, and modulation efficiency.

The principal object of the present invention, therefore, is to provide a non-mechanical modulator circuit having greatly improved operating characteristics.

Another object of the invention is to provide improved means for converting a D. C. signal voltage to a proportional A. C. signal voltage.

Still another object of the present invention is to provide an improved circuit for deriving an A. C. signal proportional in magnitude, and corresponding in phase, to the magnitude and algebraic sign of the difference between two D. C. signals.

A more specific object of the invention is to provide a differential modulator having a conversion efficiency an order of magnitude greater than that of present modulators of the type which are dependent on second order variations in tube characteristics.

Other objects and advantages of the invention will become apparent from the following specification taken in connection with the attached drawings, wherein:

Figure 1 is a wiring diagram of an electronic circuit illustrating the principles of the invention as applied to the conversion of a single D. C. signal to a corresponding A. C. signal;

Figure 2 is a wiring diagram of an electronic circuit illustrating the principles of the invention as applied to the derivation of an A. C. output signal corresponding to the difference between two input D. C. signals; and Figure 3 is a representation of the wave forms which appear at various points in the circuit of Figure 2 under various conditions.

Applicant has conceived that greatly improved operating characteristics in a modulator could be obtained by adopting an entirely new approach to the problem. This new approach involves the introduction into the circuit of an auxiliary square wave voltage signal. The auxiliary square wave signal is modified in accordance with the D. C. input signal or signals. The thus modified square wave signal is then smoothed in a suitable filter circuit, the output of which provides the desired A. C. output signal. Applicant has constructed and tested a modulator according to the principles of the present invention. The tests indicate that in comparison with presently available electronic modulators, the device is highly linear, has a high degree of accuracy, a low drift, is operable over a wide range of signals, and, in particular, has a very high modulation efficiency.

Referring now to Figure 1, a square wave generator 1 of any conventional type is provided. Square wave generator 1 is adapted, when energized from a 120 volt, 400 cycle, A. C. power supply, by way of input leads 2, to produce across its output leads 3, 4 a square wave voltage signal, as indicated at 3'. The square wave generator 1 will be understood to include amplifier stages in sufficient number to provide a square wave output signal having an amplitude suitable for the particular application. Since output lead 4 is grounded, the square wave form 3' represents the actual potential of lead 3 with respect to ground.

Lead 3 is coupled to lead 5 through a suitable resistance-capacitance network, resistor 6 of which may, for example, be of the order of 0.8 megohm. Lead 5 is connected to ground through a unidirectional device 7, which device is preferably a simple diode, such as one section of a 6AL5 type vacuum tube. As shown, the cathode of tube 7 is connected to lead 5, and its plate is connected to ground. It is apparent, therefore, that tube 7 effectively short circuits lead 5 to ground insofar as negative potentials are concerned. Accordingly, the wave form 5', which represents the potential of lead 5 with respect to ground, does not have negative half waves corresponding to those of wave form 3'.

A second unidirectional device 9, which also may be one section of a 6AL5 type diode, is provided, its plate being connected to lead 5, and its cathode being connected, by way of lead 15, to the positive side of the D. C. input signal A at terminal 14. The other side of the D. C. input signal A is connected to grounded terminal 13. In the particular circuit arrangement shown, the D. C. input signal must have a positive polarity, as will later be apparent. Since tube 9 operates to provide a short circuit between lead 5 and lead 15 whenever the positive potential of lead 5 attempts to exceed that of lead 15, the positive half waves of wave form 5' are limited in amplitude to a value substantially equal to the positive polarity input signal A. It will be apparent that in order to obtain this limiting action, the original peak to peak amplitude of the auxiliary square wave, as it appears on lead 3, must be at least twice as great as the maximum positive polarity signal A to be expected in the particular application.

There will appear, therefore, on lead 5 a square wave signal, as indicated at 5', which is at ground potential during every other half cycle, and, during alternate half cycles, has a positive potential substantially equal to the D. C. input signal A. Thus, the peak to peak amplitude of the square wave signal appearing on lead 5 is substantially equal to the D. C. input signal A. This square wave signal is applied to the input of a conventional filter 16, which filter is designed to extract the 400 cycle fundamental frequency component of the input square wave as well as associated side bands introduced by time variations in the input signal A. Accordingly, there is produced at the output terminals 18 of filter 16 the desired 400 cycle A. C. output signal $E_0$ having an amplitude proportion to the D. C. input signal A.

If desired, the circuit of Figure 1 could readily be adapted for use with a negative polarity D. C. input signal instead of a positive polarity D. C. input signal. This could be accomplished, for example, by connecting the plate of tube 7 to lead 15 rather than to ground, and connecting the cathode of tube 9 to ground rather than to lead 15. Operation will then be the same as described above except that negative half waves will appear on lead 5 rather than positive half waves.

Referring now to Figure 2, wherein there is shown a circuit arrangement adapted to derive an A. C. output signal $E_0$ proportional in magnitude, and corresponding in phase, to the magnitude and sign, respectively, of the difference between two positive polarity D. C. input signals (A and B), square wave generator 1 in this case, provides across output leads 20, 21 an auxiliary square wave voltage which is balanced with respect to ground. Accordingly, the actual square wave potential signals of leads 20 and 21, taken with respect to ground, are 180° out of phase with respect to each other, as indicated at 20' and 21', respectively.

Leads 20 and 21 are resistance-capacitance coupled to leads 22 and 23, respectively. Equal resistors 24 and 25 of the coupling network may, for example, be of the order of 0.8 megohm. Lead 22 is connected to lead 23 by way of resistor 26, potentiometer resistor 27, and resistor 28, respectively. Resistors 26 and 28 are equal and may be of the order of two megohms. The purpose of potentiometer resistor 27 is to compensate for any inequality which may exist between resistors 26 and 28, as well as any variations in operating characteristics of the balanced tubes. The variable tap on potentiometer resistor 27 is connected to lead 29, which lead in turn is connected to the input side of filter 16. As in Figure 1, filter 16 is adapted to pass the fundamental frequency component of the 400 cycle square wave applied to its input, as well as associated side-bands introduced by time variations in the input signals A and B. The desired A. C. output signal $E_0$ then appears across output terminals 18 of the filter, as will later be apparent.

A duo-diode vacuum tube 30, which may be a type 6AL5, is provided, the cathodes thereof being connected to leads 22 and 23, respectively, and the plates thereof having a common connection to ground. Tube 30 effectively short-circuits leads 22 and 23 to ground insofar as negative potentials are concerned, thus preventing negative excursions of potential on these leads. Since the auxiliary square waves applied to leads 22 and 23, respectively, are 180° out of phase with respect to each other, the upper and lower half sections, respectively, of tube 30 will be conducting during opposite half cycles.

Another duo-diode vacuum tube 31, which also may be a type 6AL5, has its plates connected to leads 22 and 23, respectively, and its cathodes connected by way of leads 38 and 39, respectively, to the respective cathodes of a duo-triode vacuum tube 32, which may be a type 12AU7. The cathodes of tube 32 are connected together through resistor 33, potentiometer resistor 34, and resistor 35, respectively. Resistors 33 and 35 are equal and may be of the order of 0.2 megohm. The variable tap on potentiometer resistor 34 is connected to the negative side of a balanced D. C. power supply. The plates of tube 32 have a common connection to the positive side of the balanced D. C. power supply. The positive polarity D. C. input signal A is applied across input terminals 13, 14, and the positive polarity D. C. input signal B is applied across input terminals 36, 37. Input terminals 13 and 36 are grounded, and input terminals 14 and 37 are connected respectively to the control grids of tube 32.

It will be apparent that tube 32 and its associated circuit elements form a balanced cathode follower circuit. Accordingly, cathode leads 38 and 39 are maintained at positive potentials which are substantially equal to the D. C. input signals A and B, respectively. Due to the short circuiting effect of tube 31, the maximum positive potential of lead 22 is limited to a value substantially equal to the D. C. signal A, and the maximum positive potential of lead 23 is limited to a value substantially equal to the D. C. signal B. Here again, in order to obtain this limiting action, the peak to peak amplitude of the auxiliary square wave signal supplied by generator 1 must be greater than twice that of the maximum D. C. input signal to be expected. The variable tap on potentiometer resistance 34 provides a convenient adjustment to compensate for any inequality which may be present between resistors 33 and 35, as well as for variations in operating characteristics of the two half-sections of tube 32.

Accordingly, for the duration of every other half cycle, lead 23 is at ground potential, and lead 22 has a positive potential substantially equal to the D. C. input signal A. Since this positive potential is equally divided by equal resistors 26 and 28, lead 29 has for these half cycles a positive potential substantially equal to one-half of the D. C. signal A. This is indicated by wave forms 22', 23', and 29', which represent the potential of leads 22, 23, and 29, respectively. On alternate half cycles, lead 22 is maintained at ground potential, lead 23 has a positive potential substantially equal to the D. C. input signal B, and lead 29 has a positive potential substantially equal to one-half the D. C. input signal B.

Thus, as indicated at 29', lead 29 has a potential substantially equal to one-half of the D. C. signal A for the duration of every other half cycle, and a potential substantially equal to one-half of the D. C. signal B for the duration of the alternate half cycles. The peak to peak amplitude of the square wave potential signal appearing on lead 29 is thus substantially equal to one-half the difference between signals A and B. Furthermore, it will be apparent that the phase of the square wave signal 29' will depend upon the relative magnitudes of signals A and B. The particular phase shown results when signal A is greater than signal B. If signal A were smaller than signal B, the phase of square wave 29' would be reversed. Since filter 16 extracts the fundamental frequency component of the square wave applied to its input, the desired A. C. output signal $E_0$ is provided across output terminals 18, the magnitude of $E_0$ being proportional to the quantity $(A-B)$, and the phase of $E_0$ depending upon the sign of the quantity $(A-B)$.

In Figure 3, the relationship between wave forms 22', 23', and 29' are more clearly illustrated for three different cases.

Case I (Figures 3a, b, and c) illustrates the wave forms under the condition that the D. C. input signals A and B are equal. In this case, as in all cases, wave form 22' is a square wave having a peak to peak amplitude equal to A, and wave form 23' is a square wave of opposite phase having a peak to peak amplitude equal to B. As described above, the effect of equal resistors 26 and 28 is such that the resulting wave form 29' may be obtained by dividing each of wave form 22' and 23' by two and then superimposing them. In this case, it is apparent that the wave form 29', which is obtained, has a constant value equal to $$\frac{A}{2} - \frac{B}{2}$$

Accordingly, the A. C. output signal produced is zero, in this instance, in conformity with the requirement that $E_0$ be proportional to the quantity $(A-B)$.

Case II (Figures 3d, e, and f) illustrates the wave forms under the condition that A is greater than B, this being the condition specifically illustrated in Figure 2. When wave forms 22' and 23' are halved and superimposed, the resulting wave form 29', in this instance, is a square wave having a peak to peak amplitude equal to $\frac{1}{2}(A-B)$. Accordingly, the A. C. output $E_0$ is proportional to the magnitude of the quantity $(A-B)$ as required.

Case III (Figures 3g, h, and i) illustrates the wave forms under the condition that B is greater than A. Here again, the resulting wave form 29' is a square wave having a peak to peak amplitude equal to one-half the difference between signals A and B. Accordingly, the A. C. output signal $E_0$ is proportional to the magnitude of the quantity $(A-B)$, as required. It will also be noted that the wave form 29' of case III is 180° out of phase with respect to wave form 29' of case II. Accordingly, the A. C. output signal $E_0$ will also be reversed in phase in the two cases. This reversal in phase occurs as a result of the reversal in sign of the quantity $(A-B)$ in the two cases, as desired.

For best results, there are certain criteria which are preferably observed in the design of the circuit of Figure 2. As has already been mentioned, the peak to peak amplitude of the auxiliary square wave signal supplied by generator 1 must be greater than twice the maximum value of either D. C. input signal, and is preferably substantially greater. The auxiliary square wave signal should have accurately balanced and identical opposing half waves, and preferably should conform quite accurately to a true square wave. Also, the ohmic value of resistors 24 and 25 should be high in comparison with the resistance in the conducting direction of tube 31 and its associated D. C. input signal circuits. In this connection, the purpose of the cathode follower circuit of tube 32 is to maintain this ratio high and thereby improve the operating characteristics of the overall circuit. If the D. C. input signals are high and/or their source impedances are low, the cathode follower circuit of tube 32 might be dispensed with completely, as was done in the circuit of Figure 1. In such case, terminals 14 and 37 could be connected directly to the respective cathodes of tube 31. Conversely, in the circuit of Figure 1, it might be desirable, in a particular application, to provide a cathode follower between the D. C. input signal A and tube 9 in order to reduce the source impedance introduced into the circuit.

A mathematical analysis by means of the Fourier series can be made to determine the proportionality constant which relates the amplitude of the fundamental frequency component of wave form 29' to its actual amplitude as a square wave. Such an analysis indicates that the proportionality constant is 1.2733. Since the peak to peak amplitude of square wave form 29' is equal to the quantity $\frac{1}{2}(A-B)$, the actual A. C. output signal $E_0$ has a peak to peak amplitude equal to $0.6366(A-B)$, that is, the modulation efficiency of the modulator shown in Figure 2 is $63+\%$. This is an improvement by better than an order of magnitude over the modulation efficiency of approximately 3% provided by conventional electronic modulators which rely on second order variations in tube characteristics, such as the screen grid balanced modulators.

As actually illustrated in Figure 2, the circuit requires that the D. C. input signals A and B have positive polarities. However, the circuit could be readily modified to accommodate negative polarity D. C. input signals, if desired. For example, if it were desired to employ negative polarity D. C. input signals, both cathodes of tube 31 would be connected to ground instead of to leads 38 and 39, and the plates of tube 30 would be disconnected from ground and connected respectively to leads 38 and 39.

It should be noted that diodes 7 and 9 of Figure 1, and duotriodes 30 and 31 of Figure 2, serve as unidirectional conduction devices. Insofar as the principles of operation of the present invention are concerned, they could be replaced by other types of unidirectional devices, such as copper oxide rectifiers and so forth.

In the interest of simplifying the explanation of the operation of the circuit of Figure 2, the effect of the constant bias of the cathode follower circuits of tube 32 has not been taken into account in the above description. Actually, the potentials of leads 38 and 39, instead of being equal to the D. C. signals A and B, respectively, will be more positive by a constant amount equal to the tube bias. Accordingly, the amplitude of the positive pulses of wave forms 22' and 23' will, in each case, be increased by a constant amount. It will readily be apparent that the only effect on square wave form 29' will be that its D. C. reference potential will be raised, its peak to peak amplitude remaining exactly the same as heretofore described. In order to obtain the necessary limiting action of tube 31, the peak to peak amplitude of the auxiliary square wave produced by generator 1 must actually be at least twice the sum of this bias plus the maximum D. C. signal to be expected. It will also be apparent that by reason of this cathode follower bias, the circuit arrangement of Figure 2 may accommodate negative polarity D. C. signals of magnitudes less than that of the bias, as well as positive polarity D. C. signals.

It will be obvious to those skilled in the electronics art that there may occur many instances in which it may be desirable to derive a square wave bearing the particular relationship to two D. C. input signals that wave form 29' bears to the D. C. signals A and B. Accordingly, the circuits of Figures 1 and 2 are generally useful in the absence of the final filter 16.

Since many changes could be made in the above construction and many widely different embodiments of this invention could be made without departing from the scope thereof, it is intended that all matters contained in the above description or shown in the accompanying drawings shall be interpreted as illustrative and not in a limiting sense.

I claim:

1. Apparatus for producing at its output terminals a variable amplitude square wave voltage signal having an instantaneous peak to peak amplitude substantially equal to a variable amplitude D. C. input signal, comprising a constant amplitude square wave generator for producing an auxiliary square wave voltage signal, means coupling said square wave generator to the output terminals of said apparatus, and two parallel circuits connected across the output terminals, one of said parallel circuits consisting of a unidirectional conduction device, and the other of said parallel circuits consisting of a second unidirectional device and means for connecting in series therewith, in a direction to oppose conduction therethrough, said D. C. input signal, said two unidirectional devices being connected in said two parallel circuits in opposed conducting relationship.

2. Apparatus for converting a variable amplitude D. C. input voltage signal to a corresponding variable amplitude A. C. output voltage signal, comprising a constant amplitude square wave generator for producing at its output terminals an auxiliary square wave voltage signal, a filter adapted to pass frequencies in the vicinity of the fundamental frequency of said auxiliary square wave signal, a coupling circuit interconnecting the output of said generator and the input of said filter, and two circuits connected in parallel across the input of said filter, one of said parallel circuits consisting of a unidirectional conduction device, and the other of said parallel circuits consisting of a unidirectional conduction device and means for connecting in series therewith in a direction to oppose conduction therethrough, the D. C. input voltage signal to be converted, said two unidirectional devices being connected in said two parallel circuits in opposed conducting relationship, the output of said filter providing the desired A. C. output voltage signal.

3. Apparatus for converting a variable amplitude D. C. input voltage signal referred to ground to a corresponding variable amplitude A. C. output voltage signal, comprising a constant amplitude square wave generator having one of its output terminals grounded, a filter circuit having one of its input terminals grounded and being adapted to pass frequencies in the vicinity of the operating frequency of said generator, a coupling circuit interconnecting the ungrounded output terminal of said generator and the ungrounded input terminal of said filter circuit, a unidirectional conduction device connected to effectively short circuit to ground the ungrounded input terminal of said filter circuit with respect to voltages of an opposite polarity from the polarity of the D. C. input voltage signal, and a second unidirectional conduction device connected to effectively short circuit the ungrounded input terminal of said filter to the ungrounded side of said D. C. input voltage signal with respect to voltages of the same polarity as said D. C. input voltage signal, the output of said filter circuit providing the desired A. C. output voltage signal.

4. Apparatus for producing at its output terminals a square wave voltage signal having a peak to peak amplitude proportional to the difference between two D. C. input voltage signals of the same polarity, and having a phase corresponding to the sign of that difference, comprising a square wave generator for producing at its output terminals an auxiliary square wave voltage signal balanced with respect to ground, a four resistor series circuit connected across the output terminals of said generator, the second and third of said resistors having equal resistance values, a first unidirectional conduction device connecting the point intermediate the first and second of said resistors to ground, a second unidirectional conduction device connecting said point to ground through one of the D. C. input voltage signals in a direction to oppose conduction through said second unidirectional conducting device, said first and said second unidirectional devices being connected in opposed conducting relationship, a third unidirectional conduction device connecting the point intermediate the third and fourth of said resistors to ground, and a fourth unidirectional conduction device connecting said last named point to ground through the other D. C. input voltage signal in a direction to oppose conduction through said fourth unidirectional conducting device, said third and said fourth unidirectional devices being connected in opposed conducting relationship, the desired square wave output voltage signal appearing between ground and a point intermediate the second and third of said resistors.

5. Apparatus for providing an A. C. output voltage signal proportional in magnitude, and corresponding in phase, to the magnitude and sign, respectively, of the difference between two D. C. input signals of the same polarity, comprising a square wave generator for producing at its output terminals an auxiliary square wave voltage signal balanced with respect to ground, a four resistor series circuit connected across the output terminals of said generator, the second and third of said resistors having equal resistance values, a first unidirectional conduction device connecting the point intermediate the first and second of said resistors to ground, a second unidirectional conduction device connecting said point to ground through one of the D. C. input voltage signals in a direction to oppose conduction through said second unidirectional conduction device, said first and said second unidirectional devices being connected in opposed conducting relationship, a third unidirectional conduction device connecting the point intermediate the third and fourth of said resistors to ground, a fourth unidirectional conduction device connecting said last named point to ground through the other D. C. input voltage signal in a direction to oppose conduction through said fourth unidirectional conduction device, said third and said fourth unidirectional devices being connected in opposed conducting relationship, and a filter circuit having its input terminals connected between ground and the point intermediate the second and third of said resistors, for extracting the fundamental frequency component of the square wave voltage signal which appears between ground and said last named point, the output of said filter circuit providing the desired A. C. output voltage signal.

6. Apparatus for providing an A. C. output voltage signal proportional in magnitude, and corresponding in phase, to the magnitude and sign, respectively, of the difference between two D. C. input voltage signals of the same polarity, comprising a square wave generator for producing at its output terminals an auxiliary square wave voltage signal balanced with respect to ground, a four resistor series circuit connected across the output terminals of said generator, the second and third of said resistors having equal resistance values, a first pair of diodes having their cathodes connected respectively to a point intermediate the first and second of said resistors and to a point intermediate the third and fourth of said resistors, a second pair of diodes having their plates connected respectively to a point intermediate the first and second of said resistors and to a point intermediate the third and fourth of said resistors, one of said pair of diodes having their other electrodes connected together and to ground, the other of said pair of diodes having their other electrodes connected respectively to ground through the respective D. C. input voltage signals in a direction to oppose conduction through said other pair of diodes, and a filter circuit, having its input terminals connected between ground and a point intermediate the second and third of said resistors, for extracting the fundamental frequency component of the square wave voltage signal which appears between ground and said last-named point, the output of said filter circuit providing the desired A. C. output voltage signal.

ERCELL E. St. JOHN.

REFERENCES CITED

The following references are of record in the file of this patent:

UNITED STATES PATENTS

| Number | Name | Date |
| --- | --- | --- |
| 2,148,718 | Agins | Feb. 28, 1939 |
| 2,285,044 | Morris | June 2, 1942 |